Dec. 3, 1929. J. N. MAHONEY 1,737,663
ELECTRIC SWITCH
Filed Aug. 1, 1924
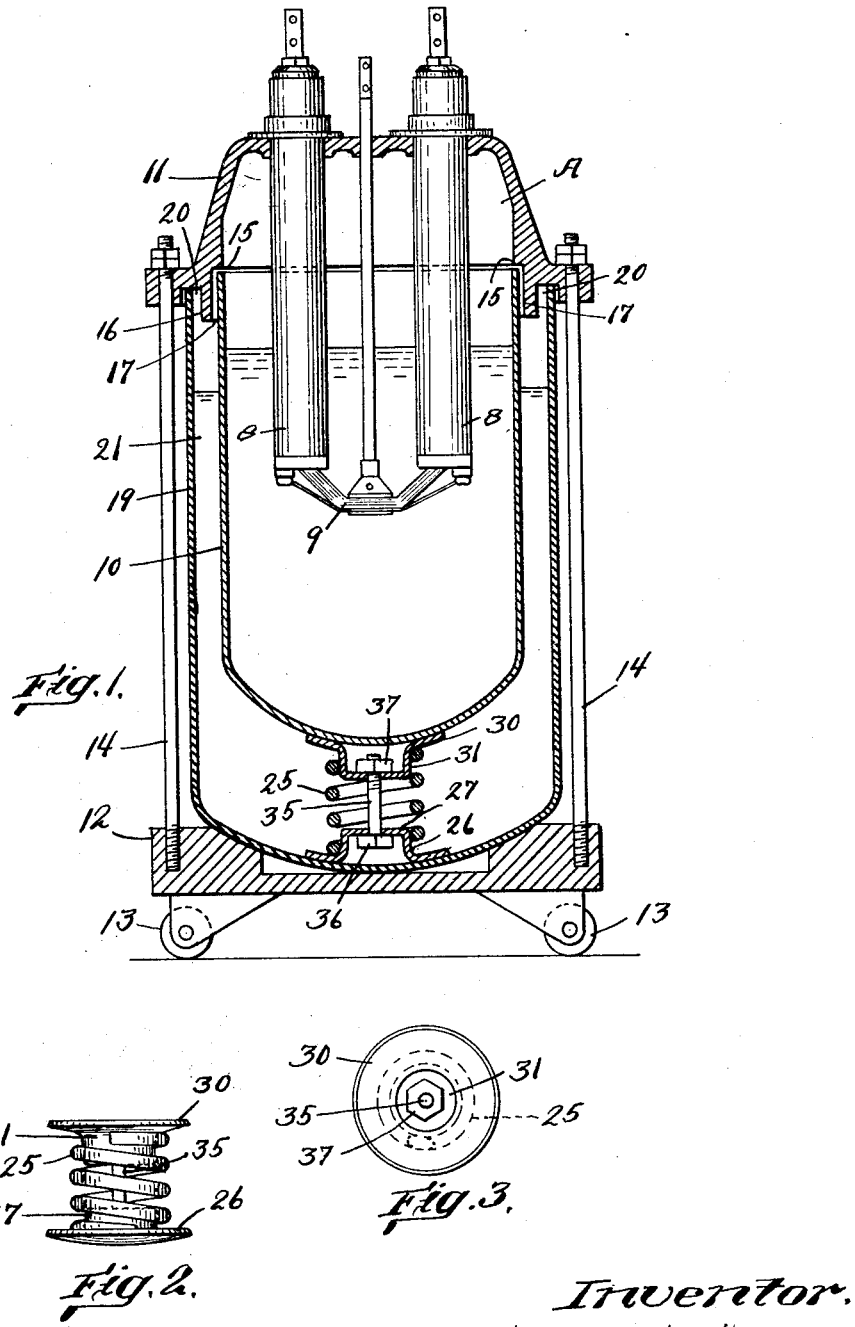

Patented Dec. 3, 1929

1,737,663

UNITED STATES PATENT OFFICE

JOSEPH N. MAHONEY, OF BROOKLYN, NEW YORK, ASSIGNOR, BY MESNE ASSIGNMENTS, TO CONDIT ELECTRICAL MANUFACTURING CORPORATION, OF BOSTON, MASSACHUSETTS, A CORPORATION OF MASSACHUSETTS

ELECTRIC SWITCH

Application filed August 1, 1924. Serial No. 729,646.

This invention relates to electric switches wherein the circuit-interrupting arc takes place in an arc-quenching liquid, as oil, and is intended as an improvement on the invention described in my co-pending application Serial No. 488,150, filed July 28, 1921, which application has eventuated as Patent No. 1,573,179, dated Februray 16, 1926.

The electric switch disclosed in said application includes a casing comprising a fixed switch frame, an oil receptacle disposed beneath said frame, and a helical spring on which said oil receptacle rests and by which it is supported yieldingly in position beneath the switch frame. When a pressure is built up within said casing, said spring is adapted to be compressed and yield, and permit the oil receptacle to move downwardly beneath the switch frame and relieve the internal pressure.

Under some conditions, it is desirable to permit the building up of a certain amount of pressure within the switch casing without a movement of the oil receptacle to relieve the pressure, and to permit the oil receptacle to yield only when the pressure exceeds a predetermined value.

An object of this invention, therefore, is the provision of means to hold the receptacle against displacement, or yielding, for internal pressures less than a predetermined value, and permit the receptacle to yield for pressures above such value.

A further object is to provide yielding supporting means for the oil receptacle comprising an initially stressed spring upon which the oil receptacle rests and is supported yieldingly.

A further object is generally to improve the construction and operation of electric switches.

Fig. 1 is a sectional elevation through an electric switch embodying the invention.

Fig. 2 is an elevation of the initially-stressed receptacle-supporting spring.

Fig. 3 is a plan view of Fig. 2.

As here shown, the electric switch embodying the invention includes a casing comprising a cylindrical receptacle 10 adapted to contain an arc-quenching fluid, as oil, and a switch frame 11 supported above and comprising a cover for the open top of said oil receptacle. Stationary and movable switch members 8 and 9 are adapted to be immersed in the arc-quenching fluid in said oil receptacle. The switch casing is adapted to contain a gas expansion space A above the oil level in the oil receptacle into which the gases and vapors formed upon circuit-interruption collect. The switch is supported by a platform 12 having wheels 13 by which the switch may be moved about. Supporting rods 14 are fixed to said platform and extend upward externally of the switch casing and are secured, preferably removably, to the switch frame 11. Said switch frame is provided with an internal ledge 15 beneath which the upper edge of the oil receptacle 10 is disposed but, in accordance with this invention, against which it is not adapted to bear to any considerable extent. A peripheral flange 16 depends from said frame over and around the side wall of the oil receptacle and is spaced therefrom to provide a peripheral venting passage 17 by which gases may escape from the switch and internal pressure therein may be relieved. The oil receptacle is adapted to be moved downwardly upon the development of sufficient internal pressure, whereby to increase the volume of the expansion space and also to move away from said ledge 15, whereby to permit free communication between said venting passage and the interior of the switch casing, thereby to relieve the internal pressure.

A cylindrical outer receptacle 19 surrounds and encloses said oil receptacle and is carried by the platform 12. The end of its side wall may be received in a peripheral groove 20 formed in the switch frame 11. Said outer receptacle is spaced from the inner or oil receptacle 10 whereby to provide a long, deep and narrow peripheral compartment 21 into which said venting passage 17 communicates; and said compartment 21 is adapted to vent into the atmosphere through the joint between the top of said outer receptacle 19 and the switch frame or in some other suitable manner. Oil is ordinarily expelled from the oil receptacle 10, along with gases and vapors, when the switch is opened under heavy overload and the oil is adapted to be collected in the space between said two receptacles.

The oil receptacle 10 is supported yieldingly in raised position beneath the abutment 15 of the switch frame by a helical spring 25, which spring is disposed in the space between the bottoms of the two receptacles and rests upon the bottom of the outer receptacle and is adapted to engage the bottom of and support said oil receptacle. A circular bearing plate 26 may be interposed between the spring and the bottom of the outer receptacle and may be suitably shaped, as convexed, whereby to bear over substantially its entire area upon the convex inner bottom face of the outer receptacle. Said plate may be formed or provided with a raised hub 27 in the middle thereof over which hub the lower end of said spring 25 is disposed; and said hub serves to hold said spring and plate against relative displacement. A similar bearing plate 30 is interposed between the upper end of said spring and the bottom of said oil receptacle; and said plate may be concaved or dished suitably to conform substantially to the convex outer bottom face of the oil receptacle, whereby to obtain good bearing contact therewith. Said plate 30 is formed or provided with a hub 31 in the middle thereof, over which hub the upper end of said spring 25 is disposed; and said hub serves to hold said spring and plate against relative lateral displacement.

Means are provided to place said spring under initial stress, or compression, before being placed in the switch, and said means includes a compression member, as a bolt 35, which bolt is passed through the hubs of both plates and has a head 36 which engages the hub-wall of the lower plate 26 and a nut 37 which engages the hub-wall of the upper plate 30. Said nut 37 is adjustably screw-threaded on said bolt and the initial stress placed upon said spring may be varied by rotating the nut in one or the other direction on said bolt. Preferably the depth of said hubs is sufficient to receive said bolts and nut without permitting them to protrude above the bearing surfaces of the plates.

With the provision of an initially-stressed supporting spring the oil receptacle will yield and move downwardly only when the pressure rise within the switch is equal to or greater than the pressure for which said spring is adjusted, whereby to increase the expansion space of the switch and increase the freedom of venting; and for internal pressures less than the value for which the spring is adjusted, the oil receptacle will be held unyieldingly in position. The arrangement is such that the spring may be initially-stressed to any desired degree before assembling it in the switch.

The construction may be otherwise modified without departing from the spirit of the invention.

I claim:

1. An electric switch having an outer receptacle, a movable inner receptacle, and initially-stressed resilient means disposed between said receptacles and arranged to support said inner receptacle yieldingly from the bottom of said outer receptacle.

2. An electric switch having an outer receptacle, a movable inner receptacle, and initially-stressed resilient means disposed between said receptacles.

3. An electric switch having a switch frame, a receptacle disposed therebeneath, and resilient means interposed between the two, said resilient means characterized by being under substantial initial stress prior to its association with said frame and receptacle.

4. An electric switch having a fluid-containing receptacle, and initially-stressed resilient supporting means for said receptacle bearing against the bottom of said receptacle.

5. An electric switch having an outer receptacle, an initially-stressed helical spring disposed within said receptacle upon the bottom thereof, and an oil receptacle disposed within said outer receptacle and upon said initially-stressed helical spring.

6. An electric switch having an oil receptacle, supporting means therefor including a helical spring bearing against the bottom of said receptacle, and means independent of said receptacle to place said spring under an initial stress.

7. An electric switch having an oil receptacle, supporting means therefor including a helical spring bearing against the bottom of said receptacle, and means independent of said receptacle to place said spring under an initial stress comprising means to compress said spring.

8. An electric switch having an oil receptacle, supporting means therefor including a helical spring bearing against the bottom of said receptacle, means to place said spring under an initial compression, and means to vary the amount of such initial compression.

9. An electric switch having an oil receptacle, supporting means therefor including a helical spring bearing against the bottom of said receptacle, and means to place said spring under initial compression including means passed through the spring and engaging and exerting pressure upon the opposite ends of said spring.

10. An electric switch having an oil receptacle, supporting means therefor including a helical spring bearing against the bottom of said receptacle, and means to place said spring under initial compression including plates engaging the opposite ends of said spring, and a pressure-applying member connecting said plates.

11. An electric switch having an oil receptacle, supporting means therefor including a helical spring bearing against the bottom of said receptacle, and means to place said spring under initial compression including plates engaging the opposite ends of said spring, and a pressure-applying member connecting said plates and passed through said spring.

12. An electric switch having an oil receptacle, supporting means therefor including a helical spring bearing against the bottom of said receptacle, and means to place said spring under initial compression including plates engaging the opposite ends of said spring, and a pressure-applying member connecting said plates and having means for varying the pressure on said spring.

13. An electric switch having an oil receptacle provided with a convex bottom, a helical spring disposed beneath said receptacle and adapted to support it yieldingly, and a bearing-plate interposed between said spring and the convex bottom of said receptacle and shaped to conform with said convex bottom.

14. An electric switch having an oil receptacle provided with a convex bottom, a helical spring disposed beneath said receptacle and adapted to support it yieldingly, and a bearing-plate interposed between said spring and the convex bottom of said receptacle and shaped to conform with said convex bottom, said plate having a hub extended within said spring.

15. An electric switch having an oil receptacle, a helical spring disposed beneath said receptacle and adapted to support it yieldingly, and a bearing plate interposed between said spring and the bottom of said receptacle, said plate having a hub extended into said spring.

16. An electric switch having an oil receptacle, a helical spring disposed beneath said receptacle and adapted to support it yieldingly, and a bearing plate interposed between said spring and the bottom of said receptacle, said plate having a hub extended into said spring, and a second bearing plate upon which said spring is supported also having a hub extended into said spring.

17. An electric switch having an outer receptacle provided with a concave inner bottom surface, an oil receptacle disposed within and spaced from the concave bottom of said outer receptacle, said oil receptacle having a convex bottom, a helical supporting spring for said oil receptacle disposed in the space between said two receptacles and adapted to support said oil receptacle yieldingly, a convex plate interposed between the lower end of said spring and the concave bottom of said outer receptacle, and a second and concave plate interposed between the upper end of said spring and the convex bottom of said oil receptacle.

18. An electric switch having an outer receptacle provided with a concave inner bottom surface, an oil receptacle disposed within and spaced from the concave bottom of said outer receptacle, said oil receptacle having a convex bottom, a helical supporting spring for said oil receptacle disposed in the space between said two receptacles and adapted to support said oil receptacle yieldingly, a convex plate interposed between the lower end of said spring and the concave bottom of said outer receptacle, and a second and concave plate interposed between the upper end of said spring and the convex bottom of said oil receptacle, both plates having hubs extended within said helical spring.

19. An electric switch having an outer receptacle provided with a concave inner bottom surface, an oil receptacle disposed within, and spaced from the concave bottom of said outer receptacle, said oil receptacle having a convex bottom, a helical supporting spring for said oil receptacle disposed in the space between said two receptacles and adapted to support said oil receptacle yieldingly, a convex plate interposed between the lower end of said spring and the concave bottom of said outer receptacle, a second and concave plate interposed between the upper end of said spring and the concave bottom of said oil receptacle, and a compression bolt passed through said spring and plates.

20. An electric switch having an outer receptacle provided with a concave inner bottom surface, an oil receptacle disposed within and spaced from the concave bottom of said outer receptacle, said oil receptacle having a convex bottom, a helical supporting spring for said oil receptacle disposed in the space between said two receptacles and adapted to support said oil receptacle yieldingly, a convex plate interposed between the lower end of said spring and the concave bottom of said outer receptacle, a second and concave plate interposed between the upper end of said spring and the concave bottom of said oil receptacle, both plates having hubs extended within said spring, and a compression bolt passed through said spring and hubs and having means to compress said spring.

21. An electric switch having an outer receptacle, an oil receptacle disposed within and spaced from the bottom of said outer receptacles, and supporting means for said oil receptacle including a helical spring disposed in the space between the bottoms of said receptacle and adapted to engage the bottom of and support said oil receptacle yieldingly bearing plates interposed between the ends of said helical spring and said receptacles and a bolt passed through said springs and plates and having means to compress said spring.

In testimony whereof, I have signed my name to this specification.

JOSEPH N. MAHONEY.